(12) United States Patent
Cui et al.

(10) Patent No.: US 12,143,847 B2
(45) Date of Patent: Nov. 12, 2024

(54) SYSTEMS AND METHODS FOR MEASUREMENT OBJECT MERGING FOR CSI-RS L3 MEASUREMENT

(71) Applicant: APPLE INC., Cupertino, CA (US)

(72) Inventors: Jie Cui, Cupertino, CA (US); Chunxuan Ye, San Diego, CA (US); Dawei Zhang, Cupertino, CA (US); Hong He, Cupertino, CA (US); Huaning Niu, Cupertino, CA (US); Manasa Raghavan, Cupertino, CA (US); Qiming Li, Beijing (CN); Weidong Yang, San Diego, CA (US); Xiang Chen, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 529 days.

(21) Appl. No.: 17/593,690

(22) PCT Filed: Jan. 13, 2021

(86) PCT No.: PCT/CN2021/071593
§ 371 (c)(1),
(2) Date: Sep. 22, 2021

(87) PCT Pub. No.: WO2022/151097
PCT Pub. Date: Jul. 21, 2022

(65) Prior Publication Data
US 2023/0180036 A1    Jun. 8, 2023

(51) Int. Cl.
*H04W 24/10*    (2009.01)
*H04W 56/00*    (2009.01)
*H04W 76/15*    (2018.01)

(52) U.S. Cl.
CPC ....... *H04W 24/10* (2013.01); *H04W 56/0015* (2013.01); *H04W 76/15* (2018.02)

(58) Field of Classification Search
CPC .. H04W 24/10; H04W 76/15; H04W 56/0015
See application file for complete search history.

(56) References Cited

U.S. PATENT DOCUMENTS 10,819,552 B2 * 10/2020 Hayashi .................. H04L 5/001
10,959,104 B2 * 3/2021 Hapsari ................ H04W 24/10
11,778,647 B2 * 10/2023 Kim ...................... H04W 76/27
370/329

(Continued)

FOREIGN PATENT DOCUMENTS

CN      110475281 A    11/2019
WO   2019161569 A1    8/2019

OTHER PUBLICATIONS

Mediatek Inc. , "CR on MO merge in R16", 3GPP TSG-RAN WG4 Meeting #97-e, Electronic Meeting, Change Request 38.133 CR 1202 Current version 16.5.0, Nov. 2-13, 2020, 3 pages.

(Continued)

*Primary Examiner* — Bailor C Hsu
(74) *Attorney, Agent, or Firm* — Dorsey & Whitney LLP0

(57) ABSTRACT

Embodiments of the present disclosure enable a user equipment (UE) to perform measurement object (MO) merging for channel state information reference signal (CSI-RS) layer 3 (L3) measurements. Other embodiments may be described and claimed.

20 Claims, 12 Drawing Sheets

(56) References Cited

U.S. PATENT DOCUMENTS

| | | | |
|---|---|---|---|
| 2015/0327104 A1* | 11/2015 | Yiu | H04W 36/0088 |
| | | | 455/450 |
| 2019/0253906 A1 | 8/2019 | Lin | |
| 2020/0044806 A1* | 2/2020 | Jassal | H04L 5/0094 |
| 2020/0154287 A1* | 5/2020 | Novlan | H04W 36/0069 |
| 2022/0408294 A1* | 12/2022 | Lee | H04W 76/14 |
| 2023/0030224 A1* | 2/2023 | Wang | H04W 24/10 |
| 2023/0179293 A1* | 6/2023 | Hwang | H04W 48/16 |
| | | | 455/12.1 |

OTHER PUBLICATIONS

Mediatek Inc., "CR on MO merge in R16", R4-2015210, 3GPP TSG-RAN WG4 Meeting #97-e, Electronic Meeting, Change Request 38.133 CR 1250 Current version 16.50, Nov. 2-13, 2020, 4 pages.
Mediatek Inc., "CR on MO merge in R15", R4-2014765, 3GPP TSG-RAN WG4 Meeting #97-e, Electronic Meeting, Change Request 38.133 CR 1201 Current Version 15.11.0, Nov. 2-13, 2020, 3 pages.
PCT/CN2021/071593, International Search Report and Written Opinion, Sep. 28, 2021, 9 pages.
Vivo, "Correction on beamswitch timing for aperiodic TRS", R1-2008682, 3GPP TSG-RAN WG1 Meeting #103-e, e-Meeting, Change Request 38.214 current version 16.3.0, Oct. 26-Nov. 13, 2020, 5 pages.

\* cited by examiner

SYSTEMS AND METHODS FOR MEASUREMENT OBJECT MERGING FOR CSI-RS L3 MEASUREMENT

TECHNICAL FIELD

This application relates generally to wireless communication systems, including performing Layer 3 (L3) measurements.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network, such as an Evolved Packet Core (EPC). Each of the RANs operates according to a specific 3GPP RAT. For example, the GERAN implements GSM and/or EDGE RAT, the UTRAN implements universal mobile telecommunication system (UNITS) RAT or other 3GPP RAT, the E-UTRAN implements LTE RAT, and NG-RAN implements 5G RAT. In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
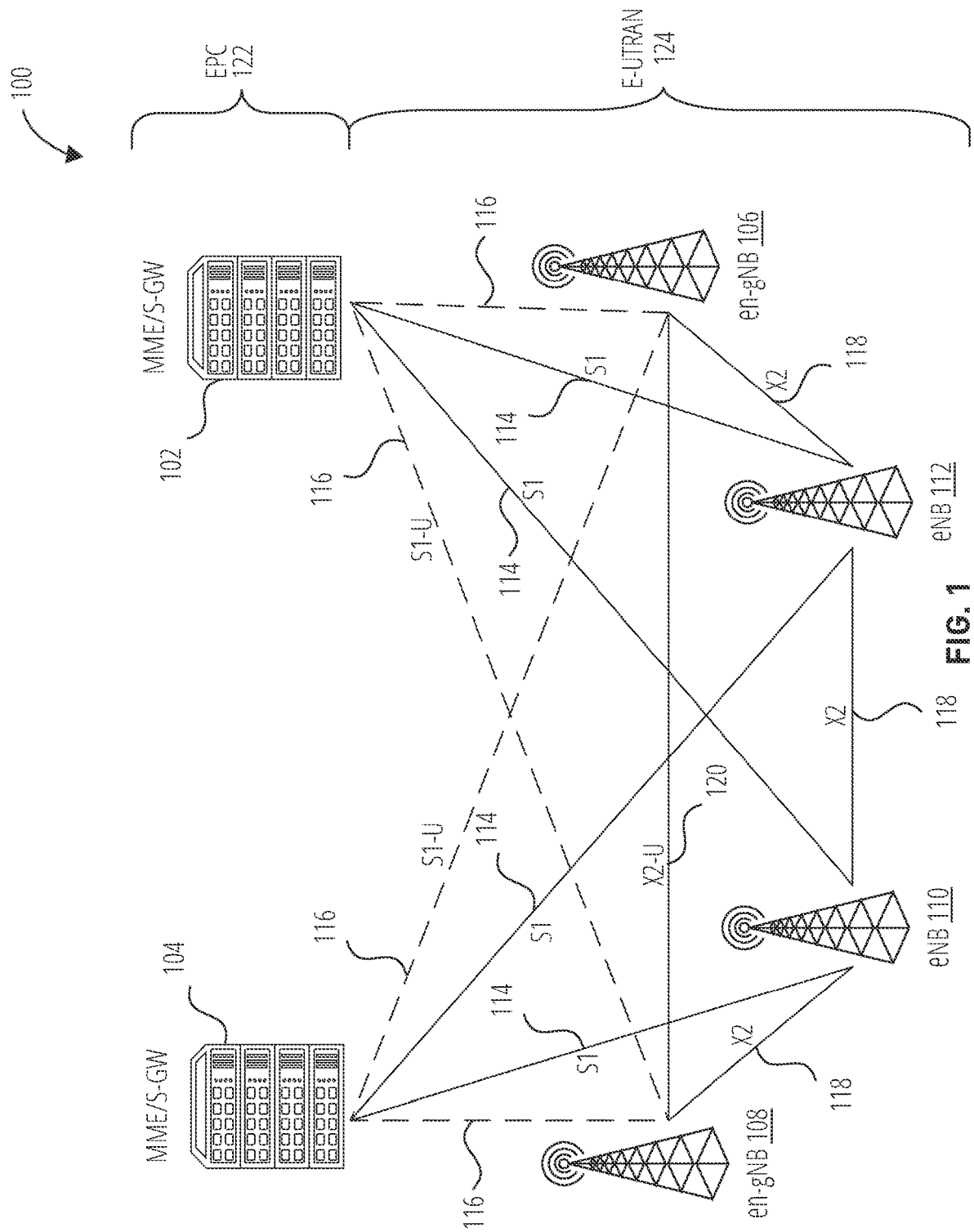
FIG. 1 illustrates an EN-DC architecture according to embodiments herein.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A wireless network may configure a UE in a connected state to perform measurements and report the measurement results according to a measurement configuration. The measurement configuration may be provided by dedicated signaling. The measurement configuration may define, for example, measurement objects, reporting configurations, measurement gaps, and other parameters. For each measurement type (e.g., intra-frequency, inter-frequency, and inter-RAT), the measurement configuration may define one or more measurement object (MO). In NR, each MO may indicate frequency, timing, subcarrier spacing (SCS), and other parameters of reference signals to be measured. An MO may be configured for synchronization signal blocks (SSB), channel state information reference signal (CSI-RS), or both. A CSI-RS resource may be configured with associated SSB. Thus, in certain embodiments, a measurement configuration includes CSI-RS resource information, cell identifiers IDs), and optionally associated SSB indication.

Layers of the Radio Interface Protocol between a UE and the network are based on the lower three layers of the Open System Interconnection (OSI) reference model, which is widely known in communication systems. Layer 1 (L1) corresponds to a physical layer and L1 measurements may be useful for procedures which must react with minimal delay, e.g. beam management procedures where the UE rapidly switches between beams. Layer 3 (L3) corresponds to radio resource control (RRC) functions and L3 measurements may be useful for radio resource management decisions that use a long term view of channel conditions (e.g., handover procedures triggered after L3 filtering to reduce the risk of ping-pang between serving cells).

In dual connectivity (DC), both a primary cell (PCell) and a primary secondary cell (PSCell) may configure CSI-RS L3 MO to the UE. It may also be possible that the PCell and PSCell configure the CSI-RS L3 MOs on the same frequency (i.e., the CSI-RS in the MO has the same center frequency between PCell configured MO and PSCell configured MO). However, conditions have not been defined that would allow a LYE to merge two MOs into one from PCell and PSCell when those two MOs are on the same frequency.

Multi-Radio Dual Connectivity (MR-DC) is a generalization of Intra-E-URA Dual Connectivity (DC), where a multiple receive (Rx)/transmit (Tx) capable UE may be configured to utilize resources provided by two different nodes connected via non-ideal backhaul, one providing NR access and the other one providing either E-UTRA or NR access. One node may act as a Master Node (MN) and the other may act as a Secondary Node (SN). The MN and SN may be connected via a network interface, and at least the MN is connected to the core network. The MN and/or the SN may be operated with shared spectrum channel access.

One type of MR-DC deployment is E-UTRA-NR Dual Connectivity (EN-DC). For example, FIG. 1 illustrates an EN-DC architecture 100 according to embodiments herein. The EN-DC architecture 100 includes an E-UTRAN 124 and an EPC 122. The E-UTRAN 124 supports MR-DC via EN-DC, in which a UE is connected to one eNB that acts as a MN and one en-gNB that acts as a SN. An en-gNB may be a node that provides NR user plane and control plane protocol terminations towards the UE, and may act as an SN in EN-DC. In FIG. 1, the EPC 122 may comprise one or more Mobility Management Entity/Serving Gateways (MME/S-GWs), such as an MME/S-GW 104 and an MME/S-GW 102. By way of example, the E-UTRAN 124 may comprise an eNB 110, an eNB 112, an en-gNB 108, and an en-gNB 106. Each of the eNB 110 and the eNB 112 may be connected to the EPC 122 via one or more S1 interfaces 114 and to one or more en-gNBs via one or more X2 interfaces 118. Each of the en-gNB 108 and the en-gNB 106 may be connected to the EPC 122 via one or more S1-U interfaces 116. The en-gNB 108 and the en-gNB 106 may be connected to one another through an X2-U interface 120.

In an LTE MN with NR SN in an EN-DC deployment, both the LTE MN and the NR SN may configure one or more measurement object (MO) to the UE via, e.g., radio resource control (RRC) signaling. In EN-DC, the PCell is an LTE PCell and the PSCell is an NR PSCell.

In certain implementations, NG-RAN supports NR-NR Dual Connectivity (NR-DC), in which a UE is connected to one gNB that acts as a MN and another gNB that acts as a SN. In addition, NR-DC can also be used when a UE is connected to two gNB-DUs, one serving the MCG and the other serving the SCG, connected to the same gNB-CU, acting both as a MN and as a SN. In NR-DC, the PCell and the PSCell are both NR cells.

In certain systems for CSI-RS based measurement reporting for a UE in an RRC connected state, only one MO is configured on a CSI-RS layer. A CSI-RS layer has one center frequency, one SCS, and one bandwidth. A measurement may be defined as a CSI-RS based intra-frequency measurement provided that the SCS of the CSI-RS resource of a neighbor cell configured for measurement is the same as the SCS of the CSI-RS resource on the serving cell indicated for measurement, the cyclic prefix (CP) type of the CSI-RS resource of a neighbor cell configured for measurement is the same as the CP type of the CSI-RS resource on the serving cell indicated for measurement, and the center frequency of the CSI-RS resource of a neighbor cell configured for measurement is the same as the center frequency of the CSI-RS resource on the serving cell indicated for measurement. For intra-frequency CSI-RS L3 measurement, only one intra-frequency CSI-RS on the intra-frequency CSI-RS layer per serving cell is configured, the bandwidth of the CSI-RS on the intra-frequency neighbor cell is within the active BWP of the UE, the CSI-RS resources and the associated SSB of the cell being identified or measured are detectable, the bandwidth of CSI-RS resources of intra-MO is the same as that of the CSI-RS resources configured for the serving cell, and numerology for intra-frequency CSI-RS and data of the serving cell are the same.

Figure 2:
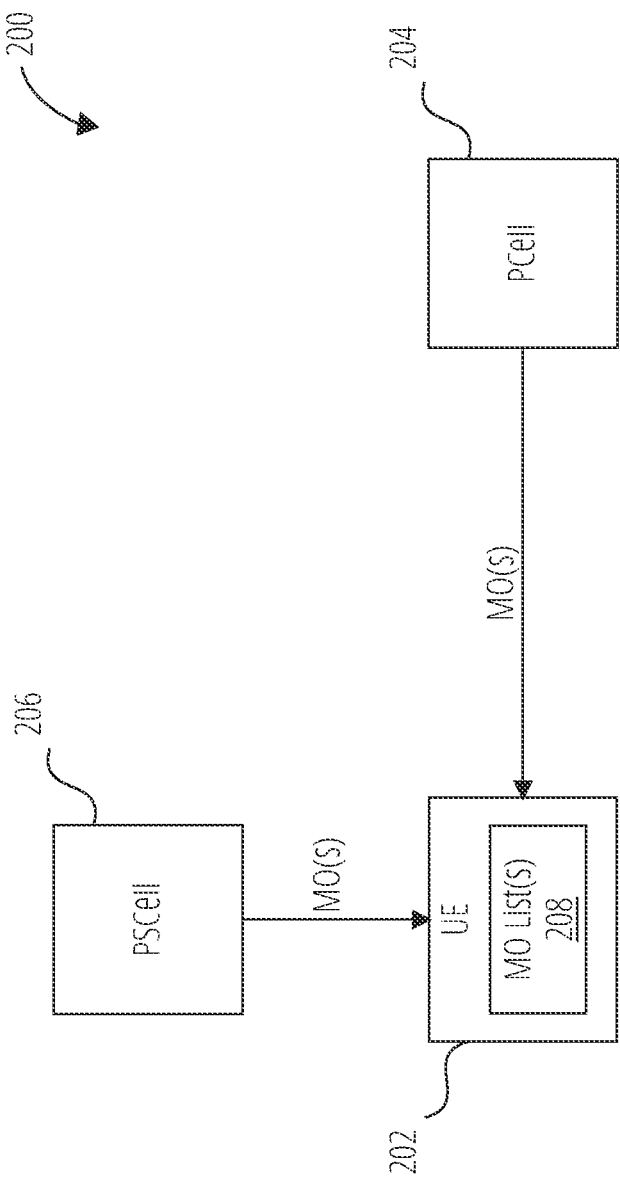
FIG. 2 is a block diagram of measurement object configuration for a UE in accordance with one embodiment.

FIG. 2 is a block diagram of measurement object configuration 200 for a UE 202 according to certain embodiments. In this example, the UE 202 is configured with MO(s) by a PCell 204 and by a PSCell 206. As discussed above, in EN-DC, the PCell 204 may be an LTE PCell and PSCell 206 may be an NR PSCell. In NR-DC, the PCell 204 and the PSCell 206 may both be NR cells. The UE 202 maintains one or more MO list(s) 208 corresponding to the MOs received from both the PCell 204 and the PSCell 206. In certain embodiments, the one or more MO list(s) 208 includes a list of effective CSI-RS L3 MOs. As discussed in detail below, the UE determines whether or not to merge two or more MOs such that the two or more MOs are counted only once in the effective CSI-RS L3 MOs. Thus, if the UE determines to merge the two or more MOs, the UE only performs one measurement process for the merged MOs (i.e., only one instance of the merged MOs is in the list of effective CSI-RS L3 MOs). If, however, the UE determines not to merge the two or more MOs, the LT performs a measurement process for each of the two or more MOs (each instance of the two or more MOs is included in the list of effective CSI-RS L3 MOs).

In one embodiment, if the PCell 204 and the PSCell 206 configure two intra-frequency MOs, the UE uses a set of merging criteria to determine whether or not to merge the MOs. In certain embodiments, the merging criteria are based on whether or not associated SSB are configured and differences in at least one parameter between the first MO and the second MO, such as different CSI-RS measurement window or CSI-RS measurement timing configuration (CMTC), different CSI-RS measurement bandwidth, or different CSI-RS density for the same CSI-RS resource.

Figure 3:
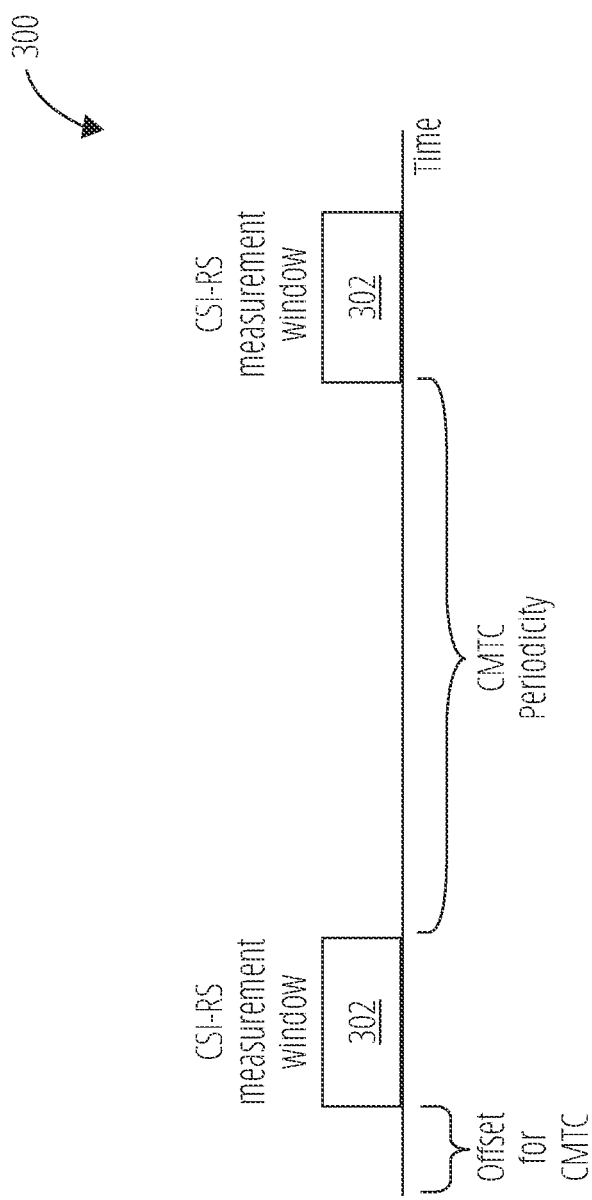
FIG. 3 illustrates a CMTC configuration according to an example embodiment.

For example, FIG. 3 illustrates a CMTC configuration 300 according to an example embodiment. In this example, CSI-RS resources for L3 measurement are configured within CSI-RS measurement windows 302. In certain embodiments, a UE does not combine MOs when the MOs have different CSL-RS measurement windows 302, different offsets for the CSI-RS measurement windows 302, and/or different periodicities of the CSI-RS measurement windows 302.

In another embodiment, if the PCell 204 and the PSCell 206 configure two inter-frequency MOs, the UE uses a set of merging criteria to determine whether or not to merge the MOs. The merging criteria may be based on whether or not the two MOs are on the same CSI-RS layer (i.e., same CSI-RS center frequency and CSI-RS SCS), or the merging criteria may be based on whether or not the two MOs are on the same CSI-RS center frequency only.

In addition, or in other embodiments, MO merging handling is provided for different associated SSBs to the same CSI-RS L3 resource.

Merging Criteria for Intra-Frequency CSI-RS L3 MOs

In one embodiment, when the PCell and PSCell configure the same intra-frequency CSI-RS L3 MOs to be measured by the UE in synchronous intra-band DC, the MOs are counted only once to the total number of effective CSI-RS L3 MOs (i.e., the MOs are merged) provided that: the associated SSBs are the same if associated SSB is configured; or the associated serving cells are same if associated SSB is not configured; or the associated serving cells are synchronized (system frame number (SFN)-s and slot boundaries are aligned) if associated SSB is not configured. However, the MOs are not counted only once to the total number of effective CSI-RS L3 MOs (i.e., are not merged), when the configured CSI-RS L3 MOs to be measured have: different CSI-RS measurement window or CSI-RS measurement timing configuration (CMTC) (e.g., different time offset of measurement window or different periodicity of measurement window); or different CSI-RS measurement bandwidth (BW); or different CSI-RS density for the same CSI-RS resource.

In another embodiment, when the PCell and PSCell configure the same intra-frequency CSI-RS L3 MOs to be measured by the UE in synchronous intra-band DC, the MOs are counted only once to the total number of effective CSI-RS L3 MOs, unless the configured CSI-RS L3 MOs to be measured have: different associated SSBs configured for same CSI-RS resource if associated SSB is configured; or different associated serving cells configured for the CSI-RS L3 MOs if associated SSB is not configured; or the associated serving cells are not synchronized (SFN-s and slot boundaries are aligned) for those CSI-RS L3 MOs if associated SSB is not configured; or different CSI-RS measurement window or CMTC (CSI-RS measurement timing configuration) (e.g., different time offset of measurement window or different periodicity of measurement window); or different CSI-RS measurement BW; or different CSI-RS density for the same CSI-RS resource.

Merging Criteria for Inter-Frequency CSI-RS L3 MOs on the Same CSI-RS Layer

In one embodiment, when the PCell and PSCell configure the inter-frequency CSI-RS L3 MOs to be measured by the UE on the same CSI-RS layer (i.e., the same CSI-RS center frequency and CSI-RS SCS) in synchronous intra-band DC, the MOs are counted only once to the total number of effective CSI-RS L3 MOs (i.e., the MOs are merged) provided that: the associated SSBs are same if associated SSB is configured; or the associated serving cells are same if associated SSB is not configured; or the associated serving cells are synchronized (SFN-s and slot boundaries are aligned) if associated SSB is not configured. However, the MOs are not counted only once to the total number of effective CSI-RS L3 MOs (i.e., are not merged), when the configured CSI-RS L3 MOs to be measured have: different CSI-RS measurement window or CMTC (CSI-RS measurement timing configuration) (e.g., different time offset of measurement window or different periodicity of measurement window); or different CSI-RS measurement BW; or different CSI-RS density for the same CSI-RS resource.

In another embodiment, when the PCell and PSCell configure the inter-frequency CSI-RS L3 MOs to be measured by the UE on the same CSI-RS layer (i.e., the same CSI-RS center frequency and CSI-RS SCS) in synchronous intra-band DC, the MOs are counted only once to the total number of effective CSI-RS L3 MOs, unless the configured CSI-RS L3 MOs to be measured have: different associated SSBs configured for same CSI-RS resource if associated SSB is configured; or different associated serving cells configured for the CSI-RS L3 MOs if associated SSB is not configured; or the associated serving cells are not synchronized (SFN-s and slot boundaries are not aligned) for the CSI-RS L3 MOs if associated SSB is not configured, or different CSI-RS measurement window or CMTC (CSI-RS measurement timing configuration) (e.g., different time offset of measurement window or different periodicity of measurement window); or different CSI-RS measurement BW; or different CSI-RS density for the same CSI-RS resource.

Merging Criteria for Inter-Frequency CSI-RS L3 MOs on the Same CSI-RS Center Frequency In one embodiment, when the PCell and PSCell configure the inter-frequency CSI-RS L3 MOs to be measured by the UE on the same CSI-RS center frequency in synchronous intra-band DC, the MOs are counted only once to the total number of effective CSI-RS L3 MOs (i.e., the MOs are merged) provided that: the associated SSBs are the same if associated SSB is configured; or the associated serving cells are the same if associated SSB is not configured; or the associated serving cells are synchronized (SFN-s and slot boundaries are aligned) if associated SSB is not configured. However, the MOs are not counted only once to the total number of effective CSI-RS L3 MOs (i.e., are not merged), when: different CSI-RS measurement window or CMTC (CSI-RS measurement timing configuration) (e.g., different time offset of measurement window or different periodicity of measurement window); or different CSI-RS measurement BW; or different CSI-RS density for same CSI-RS resource; or different SCS for the MOs.

In another embodiment, when the PCell and PSCell configure the inter-frequency CSI-RS L3 MOs to be measured by the UE on the same CSI-RS center frequency in synchronous intra-band DC, the MOs are counted only once to the total number of effective CSI-RS L3 MOs, unless the configured CSI-RS L3 MOs to be measured have: different associated SSBs configured for same CSI-RS resource if associated SSB is configured; or different associated serving cells configured for those CSI-RS L3 MOs if associated SSB is not configured; or the associated serving cells are not synchronized (SFN-s and slot boundaries are aligned) for those CSI-RS L3 MOs if associated SSB is not configured; or different CSI-RS measurement window or CMTC (CSI-RS measurement timing configuration) (e.g., different time offset of measurement window or different periodicity of measurement window); or different CSI-RS measurement BW; or different CSI-RS density for the same CSI-RS resource; or different SCS for the MOs.

Different Associated SSBs to the Same CSI-RS L3 Resource

In one embodiment, for CSI-RS L3 MOs on the same CSI-RS center frequency or on the same CSI-RS layer, the MOs cannot be merged if different SSBs (SSBs with different index) are associated with the same CSI-RS L3 resource(s), if the associated SSB is provided. The MOs could be from the PCell and PSCell. Because the MOs cannot be merged, the UE may handle the MOs individually or the UE may drop one or more MOs (i.e., the UE treats it as error case).

In addition, or in other embodiments, the MOs cannot be merged if different serving cell (cells with different ID) are associated with the CSI-RS L3 MOs, if the associated SSB is not provided. The MOs could be from the PCell and PSCell. Because the MOs cannot be merged, the UE shall handle the MOs individually the UE may drop one or more MOs LT treats it as error case).

In another embodiment, for CSI-RS L3 MOs on the same CSI-RS center frequency or on the same CSI-RS layer, the network associates the same CSI-RS L3 resource(s) with the identical SSB (same SSB index), if the associated SSB is provided. The MOs could be from the PCell and PSCell. Thus, this is a restriction on network behavior.

In addition, or in other embodiments, the network associates the CSI-RS L3 MOs with the identical serving cell (same cell ID) or the synchronized serving cells (SFN-s and slot boundaries are aligned), if the associated SSB is not provided. The MOs could be from the PCell and PSCell, or the MOs could be from the PCell or PSCell. This is also a restriction on network behavior.

Figure 4:
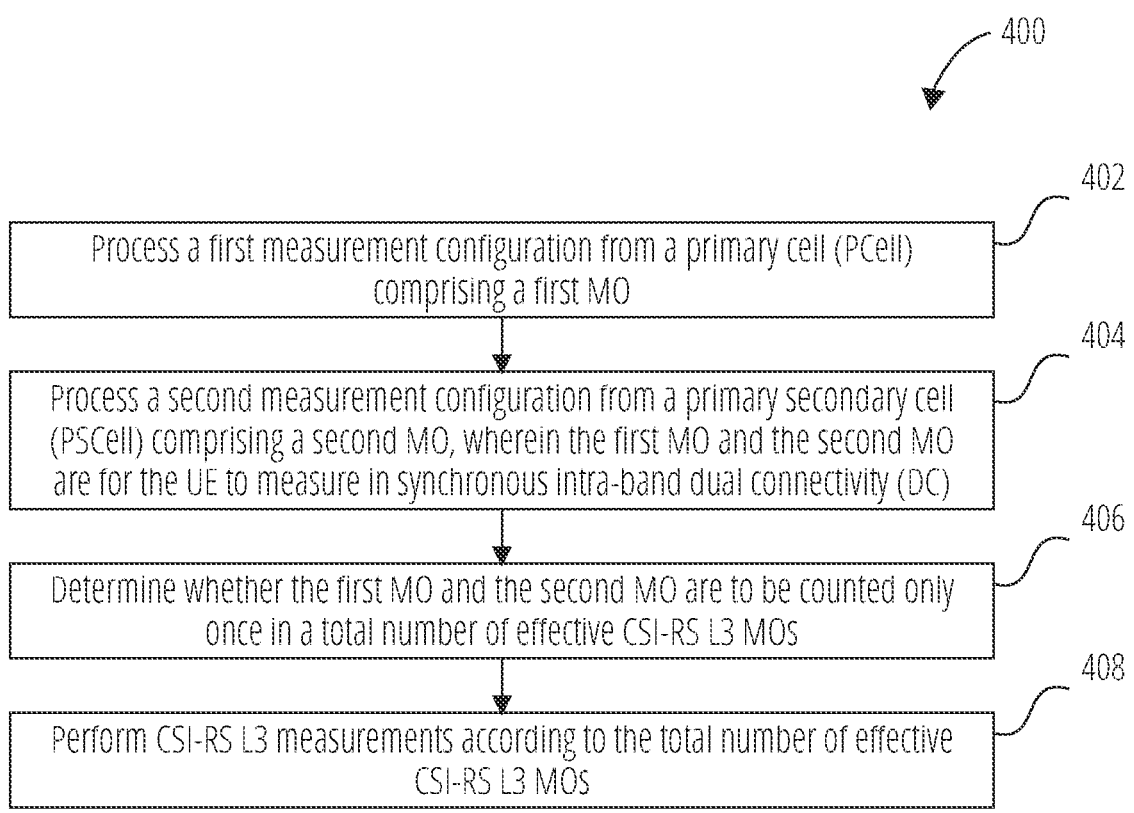
FIG. 4 is a flowchart of a method for a UE to perform MO merging for CSI-RS L3 measurements in accordance with one embodiment.

FIG. 4 is a flowchart of a method 400 for a UE to perform MO merging for CSI-RS L3 measurements according to one embodiment. The method 400 may be performed, for example, by a UE or components of a UE (e.g., one or more baseband processors) described herein. In block 402, method 400 includes processing a first measurement configuration from a PCell comprising a first MO. In block 404, the method 400 includes processing a second measurement configuration from a PSCell comprising a second MO. The first MO and the second MO are for the UE to measure in synchronous intra-band dual connectivity (DC). In block 406, the method 400 includes determining whether the first MO and the second MO are to be counted only once in a total number of effective CSI-RS L3 MOs. In block 408, the method 400 includes performing CSI-RS L3 measurements according to the total number of effective CSI-RS L3 MOs.

In one embodiment of the method 400, the first MO and the second MO are same intra-frequency CSI-RS L3 MOs for the UE to measure in the synchronous intra-band DC.

In one embodiment of the method 400, the first MO and the second MO are inter-frequency CSI-RS L3 MOs for the UE to measure on a same CSI-RS layer in the synchronous intra-band DC.

In one embodiment, the method 400 further comprises, if associated synchronization signal blocks (SSBs) are configured for CSI-RS resources corresponding to the first MO and the second MO, determining that the first CSI-RS L3 MO and the second CSI-RS L3 MO are to be counted only once in the total number of effective CSI-RS L3 MOs based on the associated SSBs being the same for the first MO and the second MO, unless there is a predetermined difference in at least one parameter between the first MO and the second MO.

In one embodiment, the method 400 further comprises, if associated synchronization signal blocks (SSBs) are not configured for CSI-RS resources corresponding to the first MO and the second MO, determining that the first CSI-RS L3 MO and the second CSI-RS L3 MO are to be counted only once in the total number of effective CSI-RS L3 MOs based on associated serving cells being the same for the first MO and the second MO, unless there is a predetermined difference in at least one parameter between the first MO and the second MO.

In one embodiment, the method 400 further comprises, if associated synchronization signal blocks (SSBs) are not configured for CSI-RS resources corresponding to the first MO and the second MO, determining that the first CSI-RS L3 MO and the second CSI-RS L3 MO are to be counted only once in the total number of effective CSI-RS L3 MOs based on associated serving cells corresponding to the first MO and the second. MO being synchronized, unless there is a predetermined difference in at least one parameter between the first MO and the second MO.

In certain embodiments, the predetermined difference comprises different CSI-RS measurement windows or different CSI-RS measurement and timing configurations.

In certain embodiments, the predetermined difference comprises different CSI-RS measurement bandwidths.

In certain embodiments, the predetermined difference comprises different CSI-RS densities for a same CSI-RS resource.

Figure 5:
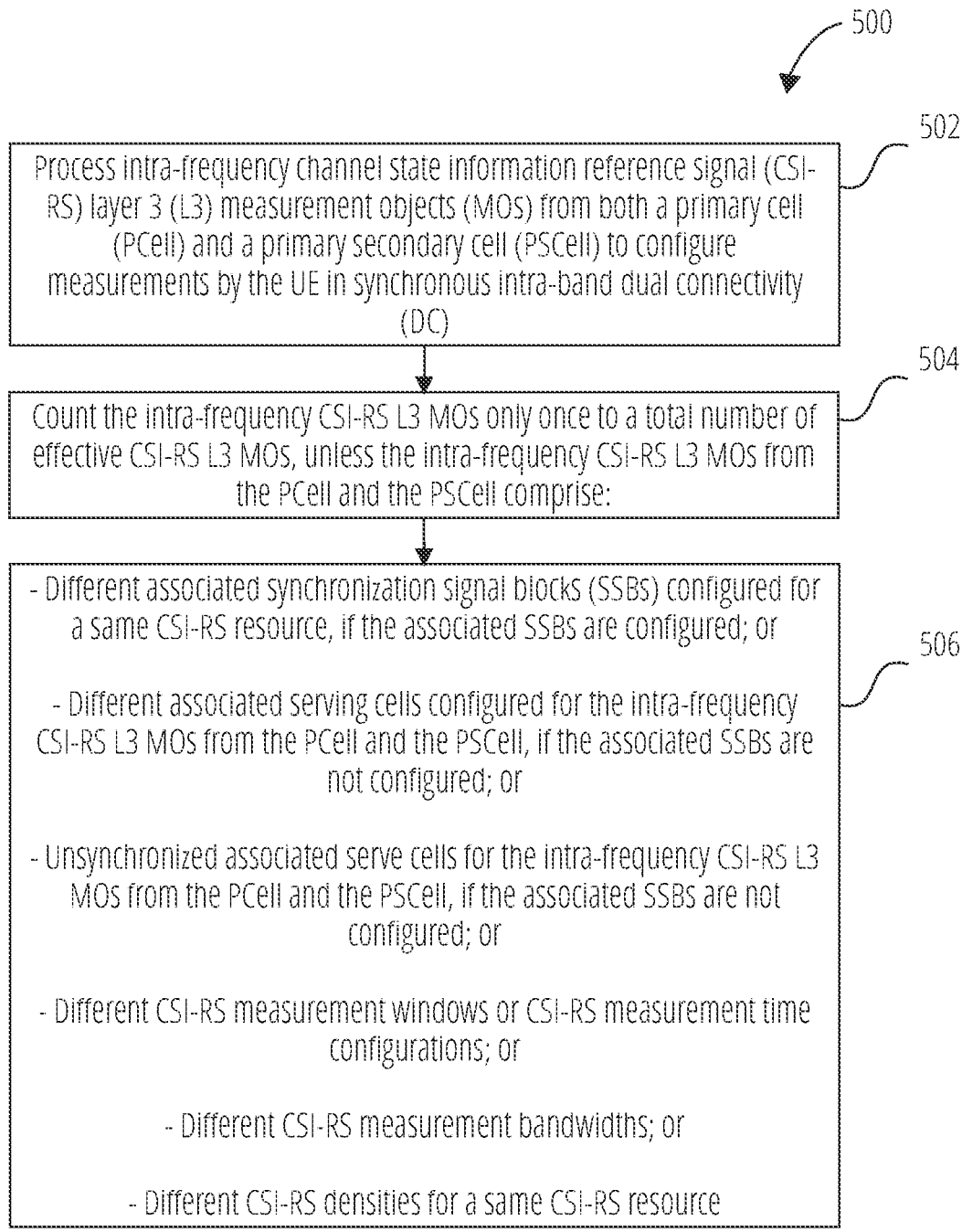
FIG. 5 is a flowchart of a method for a UE in accordance with one embodiment.
Figure 6:
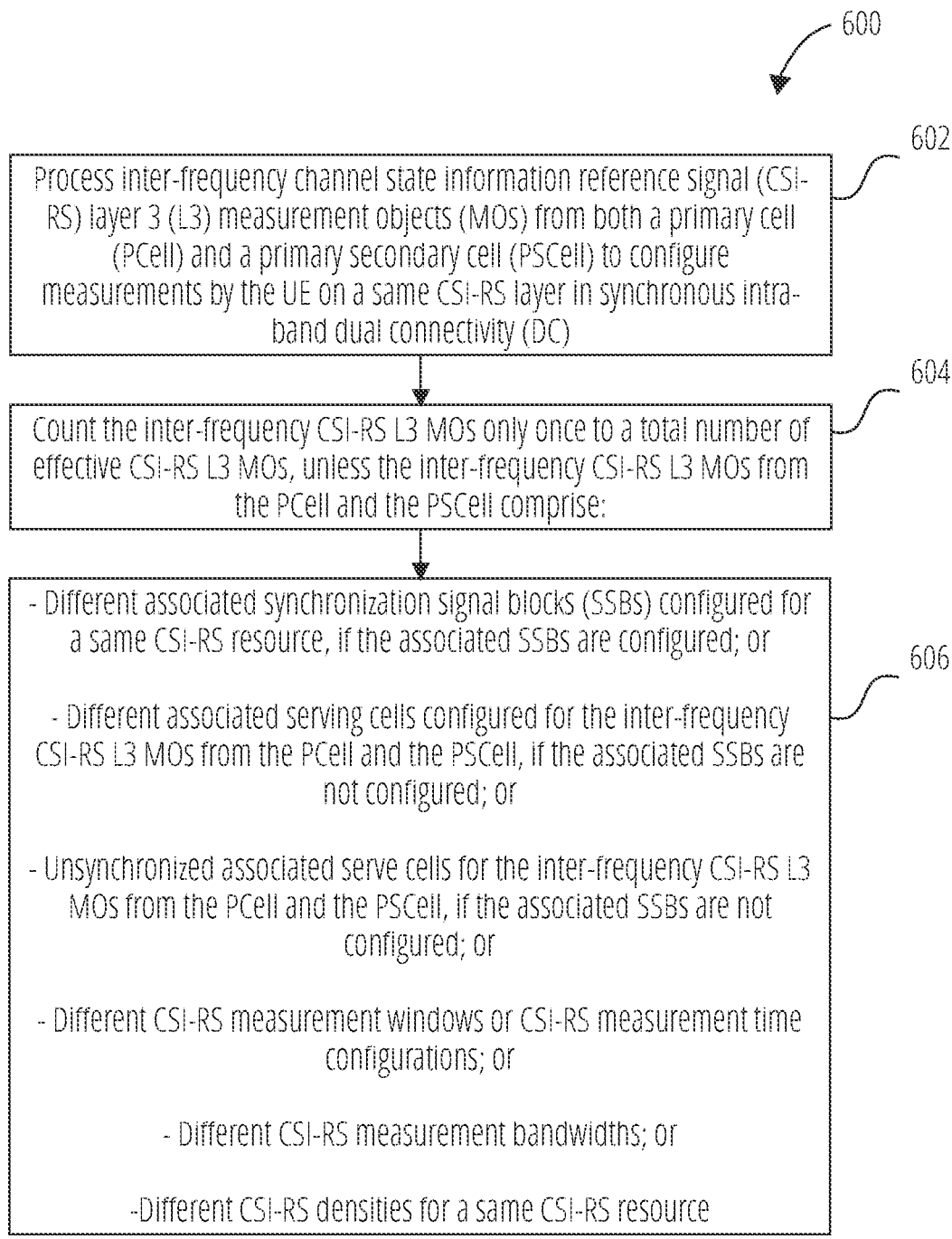
FIG. 6 is a flowchart of a method for a UE in accordance with one embodiment.

In certain embodiments, the first MO and the second MO are inter-frequency CSI-RS L3 MOs for the UE to measure on a same CSI-RS center frequency in the synchronous intra-band DC. In certain such embodiments, the predetermined difference comprises different subcarrier spacing (SCS) for the first MO and the second MO, FIG. 5 is a flowchart of a method 500 for a UE according to one embodiment. The method 500 may be performed, for example, by a UE or components of a UE (e.g., one or more baseband processors) described herein In block 502, the method 500 includes processing intra-frequency CSI-RS L3 MOs from both a PCell and a PSCell to configure measurements by the UE in synchronous intra-band dual connectivity (DC). In block 504, method 500 includes counting the intra-frequency CSI-RS L3 MOs only once to a total number of effective CSI-RS L3 MOs, unless the intra-frequency CSI-RS L3 MOs from the PCell and the PSCell comprise one of the conditions in block 506, which includes: different associated synchronization signal blocks (SSBs) configured for a same CSI-RS resource, if the associated SSBs are configured; or different associated serving cells configured for the intra-frequency CSI-RS L3 MOs from the PCell and the PSCell, if the associated SSBs are not configured; or unsynchronized associated serving cells for the intra-frequency CSI-RS L3 MOs from the PCell and the PSCell, if the associated SSBs are not configured; or different CSI-RS measurement windows or CSI-RS measurement times configurations; or different CSI-RS measurement bandwidths; or different CSI-RS densities for a same CSI-RS resource, FIG. 6 is a flowchart of a method 600 for a UE according to one embodiment. The method 600 may be performed, for example, by a UE or components of a UE (e.g., one or more baseband processors) described herein In block 602, the method 600 includes processing inter-frequency CSI-RS L3 MOs from both a PCell and a PSCell to configure measurements by the EYE on a same CSI-RS layer in synchronous intra-band dual connectivity (DC). In block 604, the method 600 counts the inter-frequency CSI-RS L3 MOs only once to a total number of effective CSI-RS L3 MOs, unless the inter-frequency CSI-RS L3 MOs from the PCell and the PSCell comprise one of the conditions in block 606, which includes: different associated synchronization signal blocks (SSBs) configured for a same CSI-RS resource, if the associated SSBs are configured; or different associated serving cells configured for the inter-frequency CSI-RS L3 MOs from the PCell and the PSCell, if the associated SSBs are not configured; or unsynchronized associated serving cells for the inter-frequency CSI-RS L3 MOs from the PCell and the PSCell, if the associated SSBs are not configured; or different CSI-RS measurement windows or CSI-RS measurement times configurations; or different CSI-RS measurement bandwidths; or different CSI-RS densities for a same CSI-RS resource.

Figure 7:
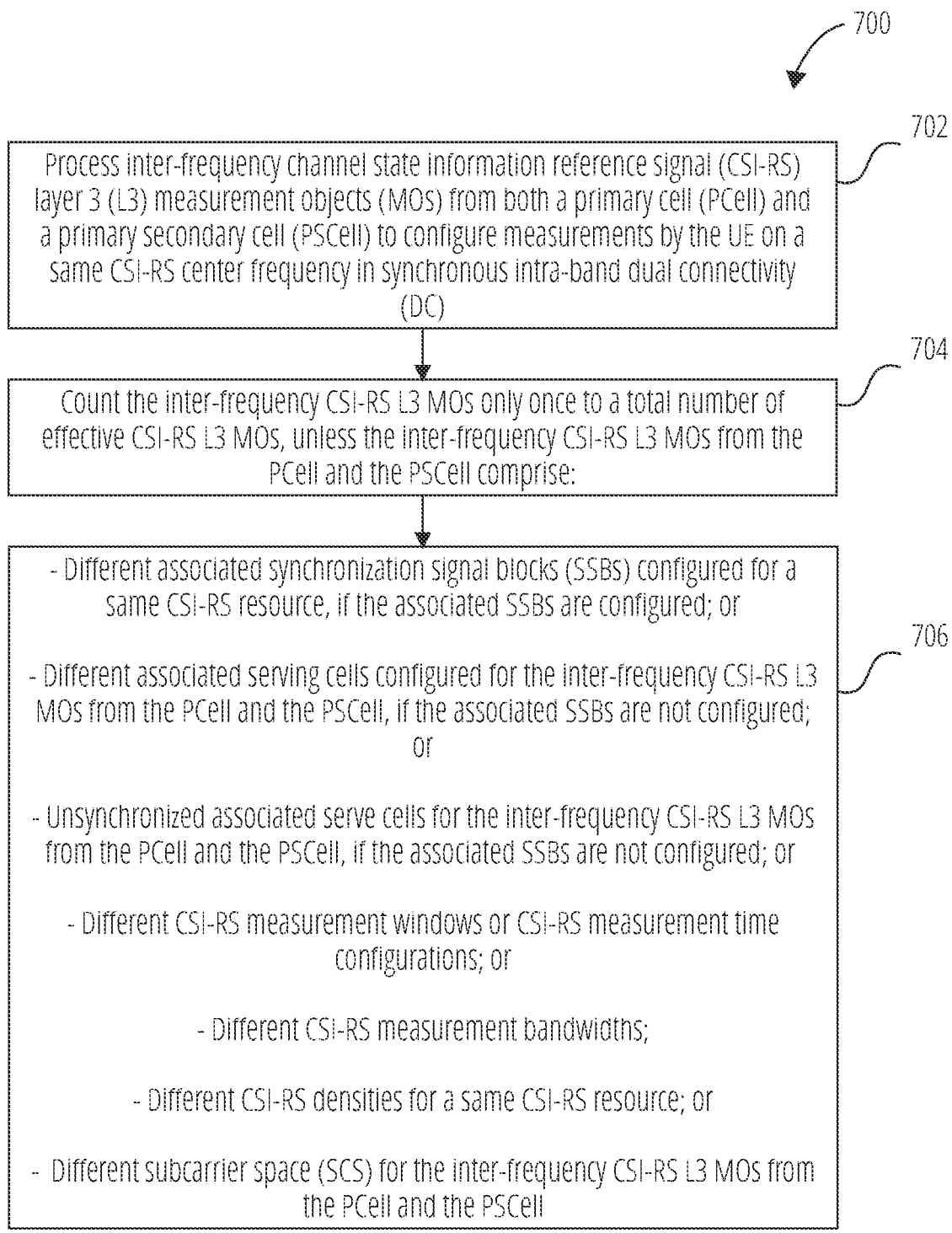
FIG. 7 is a flowchart of a method for a UE in accordance with one embodiment.

FIG. 7 is a flowchart of a method 700 for a UE according to one embodiment. The method 700 may be performed, for example, by a UE or components of a UE (e.g., one or more baseband processors) described herein. In block 702, the method 700 includes processing inter-frequency CSI-RS L3 MOs from both a PCell and a PSCell to configure measurements by the UE on a same CSI-RS center frequency in synchronous intra-band dual connectivity (DC). In block 704, the method 700 counts the inter-frequency CSI-RS L3 MOs only once to a total number of effective CSI-RS L3 MOs, unless the inter-frequency CSI-RS L3 MOs from the PCell and the PSCell comprise one of the conditions in block 706, which include different associated synchronization signal blocks (SSBs) configured for a same CSI-RS resource, if the associated SSBs are configured; or different associated serving cells configured for the inter-frequency CSI-RS L3 MOs from the PCell and the PSCell, if the associated SSBs are not configured; or unsynchronized associated serving cells for the inter-frequency CSI-RS L3 MOs from the PCell and the PSCell, if the associated SSBs are not configured; or different CSI-RS measurement windows or CSI-RS measurement times configurations; or different CSI-RS measurement bandwidths; or different CSI-RS densities for a same CSI-RS resource; or different subcarrier spacing (SCS) for the inter-frequency CSI-RS L3 MOs from the PCell and the PSCell.

Figure 8:
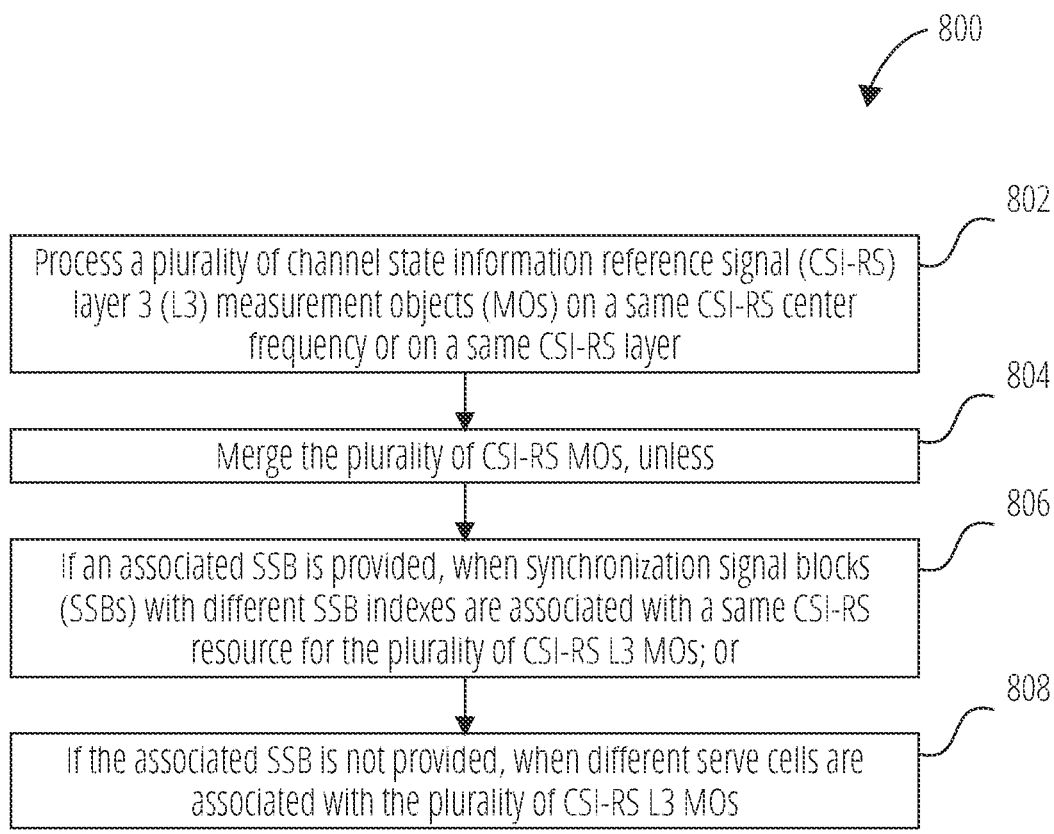
FIG. 8 is a flowchart of a method for a UE in accordance with one embodiment.

FIG. 8 is a flowchart of a method 800 for a UE according to one embodiment. The method 800 may be performed, for example, by a UE or components of a UE (e.g., one or more baseband processors) described herein. In block 802, the method 800 includes processing a plurality of CSI-RS L3 MOs on a same CSI-RS center frequency or on a same CSI-RS layer. In block 804, the method 800 includes merging the plurality of CSI-RS MOs, unless one of the conditions in block 806 or block 808 is met, which includes: if an associated SSB is provided, when synchronization signal blocks (SSBs) with different SSB indexes are associated with a same CSI-RS resource for the plurality of CSI-RS L3 MOs; or if the associated SSB is not provided, when different serving cells are associated with the plurality of CSI-RS L3 MOs.

In one embodiment, the method 800 further comprises, when the MOs cannot be merged, handling the plurality of CSI-RS MOs individually. The plurality of CSI-RS MOs is from a PCell and a PSCell.

In another embodiment, the method 800 further comprises, when the MOs cannot be merged, dropping one or more of the plurality of CSI-RS MOs. The plurality of CSI-RS MOs is from a PCell and a PSCell.

Figure 9:
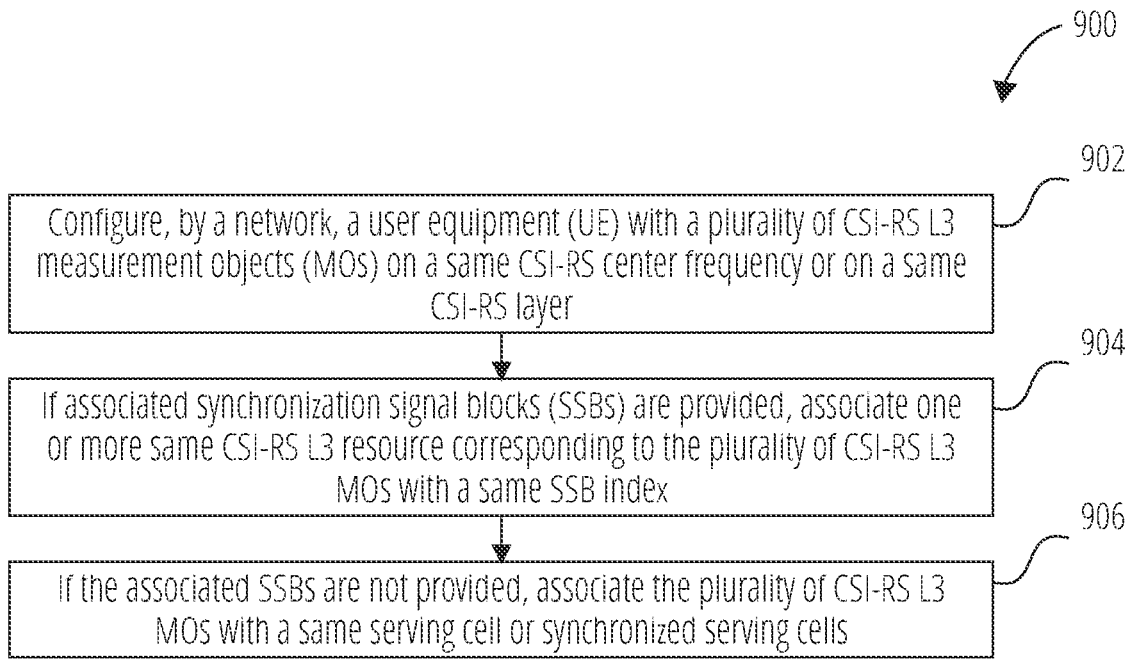
FIG. 9 is a flowchart of a method for a network in accordance with one embodiment.

FIG. 9 is a flowchart of a method 900 for a network according to one embodiment. The method 900 may be performed, for example, by a network or components of a network element (e.g., one or more baseband processors) described herein. In block 902, the method 900 includes configuring, by the network, a UE with a plurality of CSI-RS L3 MOs on a same CSI-RS center frequency or on a same CSI-RS layer. In block 904, if associated SSBs are provided, the method 900 includes associating one or more same CSI-RS L3 resource corresponding to the plurality of CSI-RS L3 MOs with a same SSB index. In block 906, if the associated SSBs are not provided, the method 900 includes associating the plurality of CSI-RS L3 MOs with a same serving cell or synchronized serving cells.

In one embodiment of the method 900, when the associated SSBs are provided, the plurality of CSI-RS L3 MOs is from both a primary cell (PCell) and a primary secondary cell (PSCell).

In one embodiment of the method 900, when the associated SSBs are not provided, the plurality of CSI-RS L3 MOs is from a primary cell (PCell), a primary secondary cell (PSCell), or from both the PCell and the PSCell.

Figure 10:
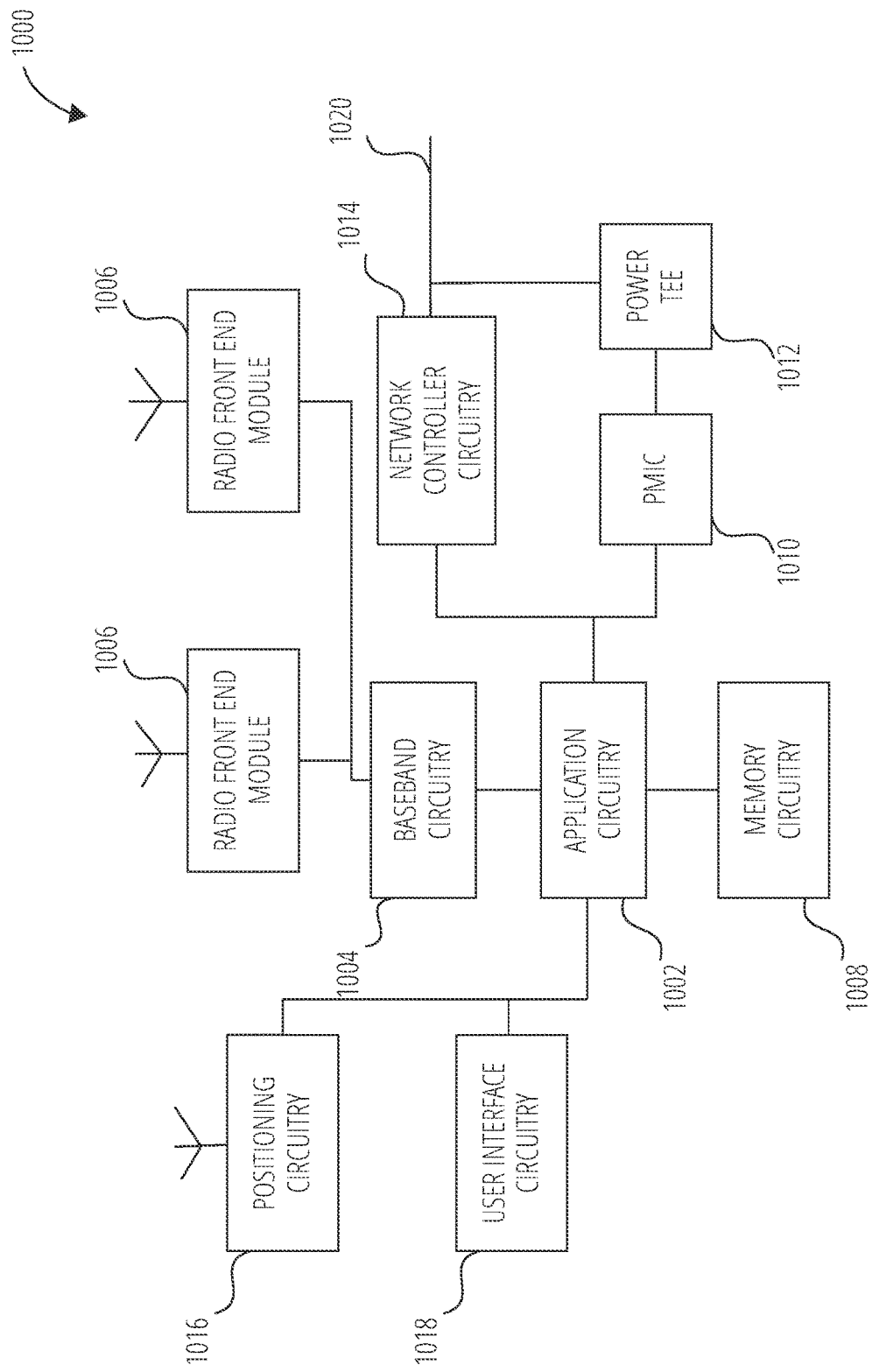
FIG. 10 illustrates an infrastructure equipment in accordance with one embodiment.

FIG. 10 illustrates an example of infrastructure equipment 1000 in accordance with various embodiments. The infrastructure equipment 1000 may be implemented as a base station, radio head, RAN node, AN, application server, and/or any other element/device discussed herein. In other examples, the infrastructure equipment 1000 could be implemented in or by a UE.

The infrastructure equipment 1000 includes application circuitry 1002, baseband circuitry 1004, one or more radio front end module 1006 (RFEM), memory circuitry 1008, power management integrated circuitry (shown as PMIC 1010), power tee circuitry 1012, network controller circuitry 1014, network interface connector 1020, satellite positioning circuitry 1016, and user interface circuitry 1018. In some embodiments, the device infrastructure equipment 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1002 includes circuitry such as, but not limited to one or more processors (or processor cores), cache memory, and one or more of low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces. Mobile industry Processor interface (MIDI) interfaces and Joint Test Access Group (JTAG) test access ports. The processors (or cores) of the application circuitry 1002 may be coupled with or may include memory/storage elements and may be configured to execute instructions stored in the memory/storage to enable various applications or operating systems to run on the infrastructure equipment 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1002 may comprise, or may be, a special-purpose processor/controller to operate according to the various embodiments herein. As examples, the processor(s) of application circuitry 1002 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, a MIPS-based design from MIPS Technologies, Inc. such as MIPS Warrior P-class processors; and/or the like. In some embodiments, the infrastructure equipment 1000 may not utilize application circuitry 1002, and instead may include a special-purpose processor/controller to process IP data received from an EPC or 5GC, for example.

In some implementations, the application circuitry 1002 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuity of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1004 may be implemented, for example, as a solder-down substrate including one or more integrated circuits, a single packaged integrated circuit soldered to a main circuit board or a multi-chip module containing two or more integrated circuits.

The user interface circuitry 1018 may include one or more user interfaces designed to enable user interaction with the infrastructure equipment 1000 or peripheral component interfaces designed to enable peripheral component interaction with the infrastructure equipment 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1008 may be implemented as one or more of solder down packaged integrated circuits, socketed memory modules and plug-in memory cards.

The PMIC 1010 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1012 may provide for electrical power drawn from a network cable to provide both power supply and data connectivity to the infrastructure equipment 1000 using a single cable.

The network controller circuitry 1014 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1020 using a physical connection, which may be electrical (commonly referred to as a "copper interconnect"), optical, or wireless. The network controller circuitry 1014 may include one or more dedicated processors and/or FPGAs to communicate using one or more of the aforementioned protocols. In some implementations, the network controller circuitry 1014 may include multiple controllers to provide connectivity to other networks using the same or different protocols.

The positioning circuitry 1016 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-Technology for Positioning, Navigation, and Timing (Micro-PNT) IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure, or the like. The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 11:
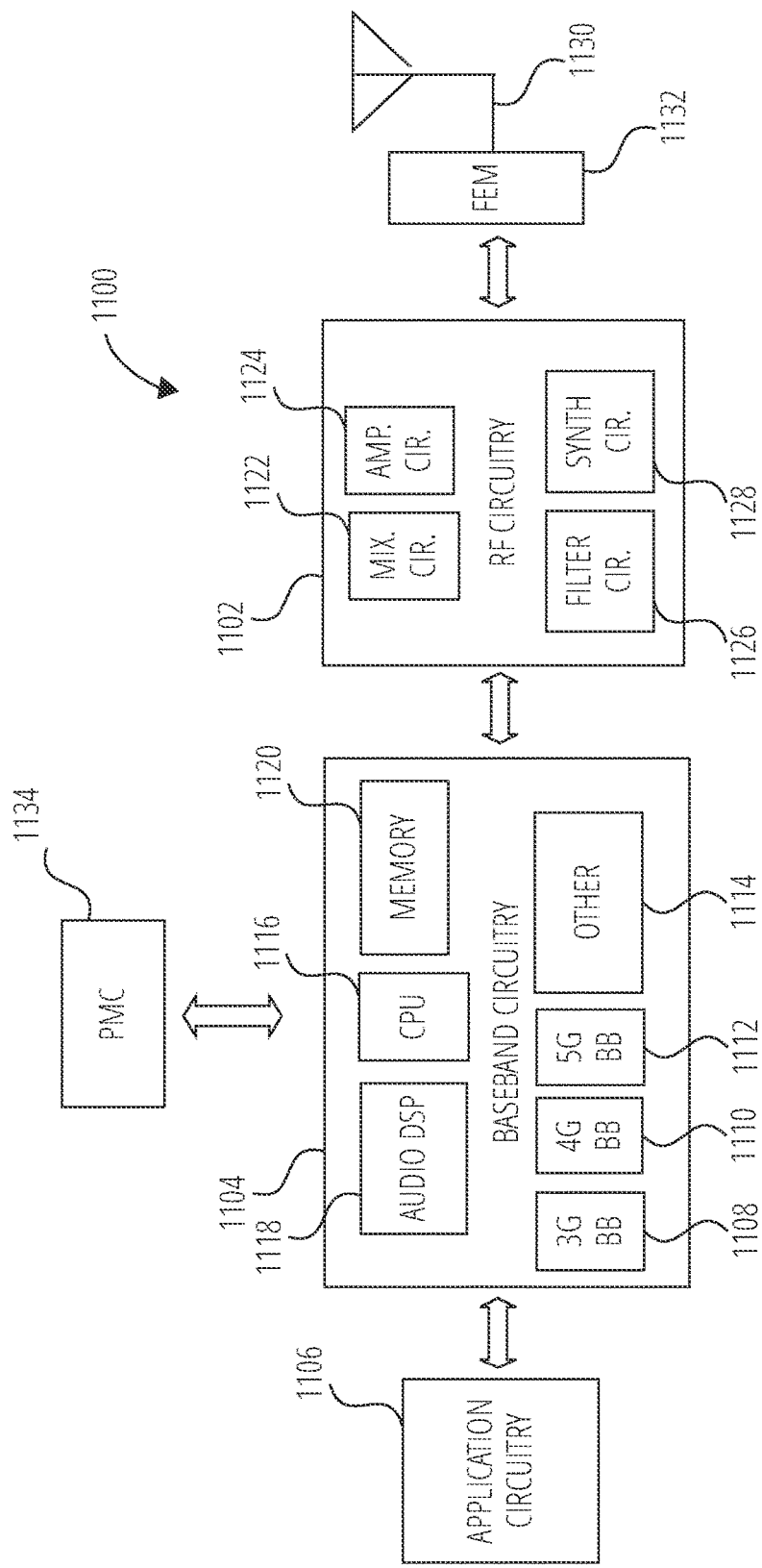
FIG. 11 illustrates a device in accordance with one embodiment.

FIG. 11 illustrates example components of a device 1100 in accordance with some embodiments. In some embodiments, the device 1100 may include application circuitry 1106, baseband circuitry 1104, Radio Frequency (RF) circuitry (shown as RF circuitry 1102), front-end module (FEM) circuitry (shown as FEM circuitry 1132), one or more antennas 1130, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1106, and instead include a processor/controller to process IP data received from an EPC). In some embodiments, the device 1100 may include additional elements such as, for example, memory/ storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1106 may include one or more application processors. For example, the application circuitry 1106 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1106 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1102 and to generate baseband signals for a transmit signal path of the RF circuitry 1102. The baseband circuitry 1104 may interface with the application circuitry 1106 for generation and processing of the baseband signals and for controlling operations of the RF circuitry 1102. For example, in some embodiments, the baseband circuitry 1104 may include a third generation (3G) baseband processor (3G baseband processor 1108), a fourth generation (4G) baseband processor (4G baseband processor 1110), a fifth generation (5G) baseband processor (5G baseband processor 1112), or other baseband processor(s) 1114 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1102. In other embodiments, some or of the functionality of the illustrated baseband processors may be included in modules stored in the memory 1120 and executed via a Central Processing Unit (CPU 1116). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), preceding, or constellation mapping/demapping functionality. In some embodiments, encoding/decoding circuitry of the baseband circuitry 1104 may include convolution, tail-biting convolution, turbo, Viterbi, or Low Density Parity Check (LDDC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1118. The one or more audio DSP(s) 1118 may include elements for compression/decompression and echo cancellation and may include other suitable processing elements in other embodiments. Components of the baseband circuity may be suitably combined in a single chip, a single chipset, or disposed on a same circuit board in some embodiments. In some embodiments, some or all of the constituent components of the baseband circuitry 1104 and the application circuitry 1106 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1102 may enable communication with wireless networks using modulated electromagnetic radiation through a non-solid medium. In various embodiments, the RF circuitry 1102 may include switches, filters, amplifiers, etc. to facilitate the communication with the wireless network. The RF circuitry 1102 may include a receive signal path which may include circuitry to down-convert RF signals received from the FEM circuitry 1132 and provide baseband signals to the baseband circuitry 1104. The RF circuitry 1102 may also include a transmit signal path which may include circuitry to up-convert baseband signals provided by the baseband circuitry 1104 and provide RF output signals to the FEM circuitry 1132 for transmission.

In some embodiments, the receive signal path of the RF circuitry 1102 may include mixer circuitry 1122, amplifier circuitry 1124 and filter circuitry 1126. In some embodiments, the transmit signal path of the RF circuitry 1102 may include filter circuitry 1126 and mixer circuitry 1122. The RF circuitry 1102 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1132 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1132. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1102 may include analog-to-digital converter (ADC) and digital-to-analog converter (DAC) circuitry and the baseband circuitry 1104 may include a digital baseband interface to communicate with the RF circuitry 1102.

In some dual-mode embodiments, a separate radio IC circuitry may be provided for processing signals for each spectrum, although the scope of the embodiments is not limited in this respect.

In some embodiments, the synthesizer circuitry 1128 may be a fractional-N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1102 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1106 (such as an applications processor) depending on the desired output frequency. In some embodiments, a divider control input (e.g., N) may be determined from a look-up table based on a channel indicated by the application circuitry 1106.

Synthesizer circuitry 1128 of the RF circuitry 1102 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1102 may include an IQ/polar converter.

The FEM circuitry 1132 may include a receive signal path which may include circuitry configured to operate on RF signals received from one or more antennas 1130, amplify the received signals and provide the amplified versions of the received signals to the RF circuitry 1102 for further processing. The FEM circuitry 1132 may also include a transmit signal path which may include circuitry configured to amplify signals for transmission provided by the RF circuitry 1102 for transmission by one or more of the one or more antennas 1130. In various embodiments, the amplification through the transmit or receive signal paths may be done solely in the RF circuitry 1102, solely in the FEM circuitry 1132, or in both the RF circuitry 1102 and the FEM circuitry 1132.

In some embodiments, the FEM circuitry 1132 may include a TX/RX switch to switch between transmit mode and receive mode operation. The FEM circuitry 1132 may include a receive signal path and a transmit signal path. The receive signal path of the FEM circuitry 1132 may include an LNA to amplify received RF signals and provide the amplified received RF signals as an output (e.g., to the RF circuitry 1102). The transmit signal path of the FEM circuitry 1132 may include a power amplifier (PA) to amplify input RF signals (e.g., provided by the RF circuitry 1102), and one or more filters to generate RF signals for subsequent transmission (e.g., by one or more of the one or more antennas 1130).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a UE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1106, the RF circuitry 1102, or the FEM circuitry 1132.

In some embodiments, the PMC 1134 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DR X) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1106 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1106 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
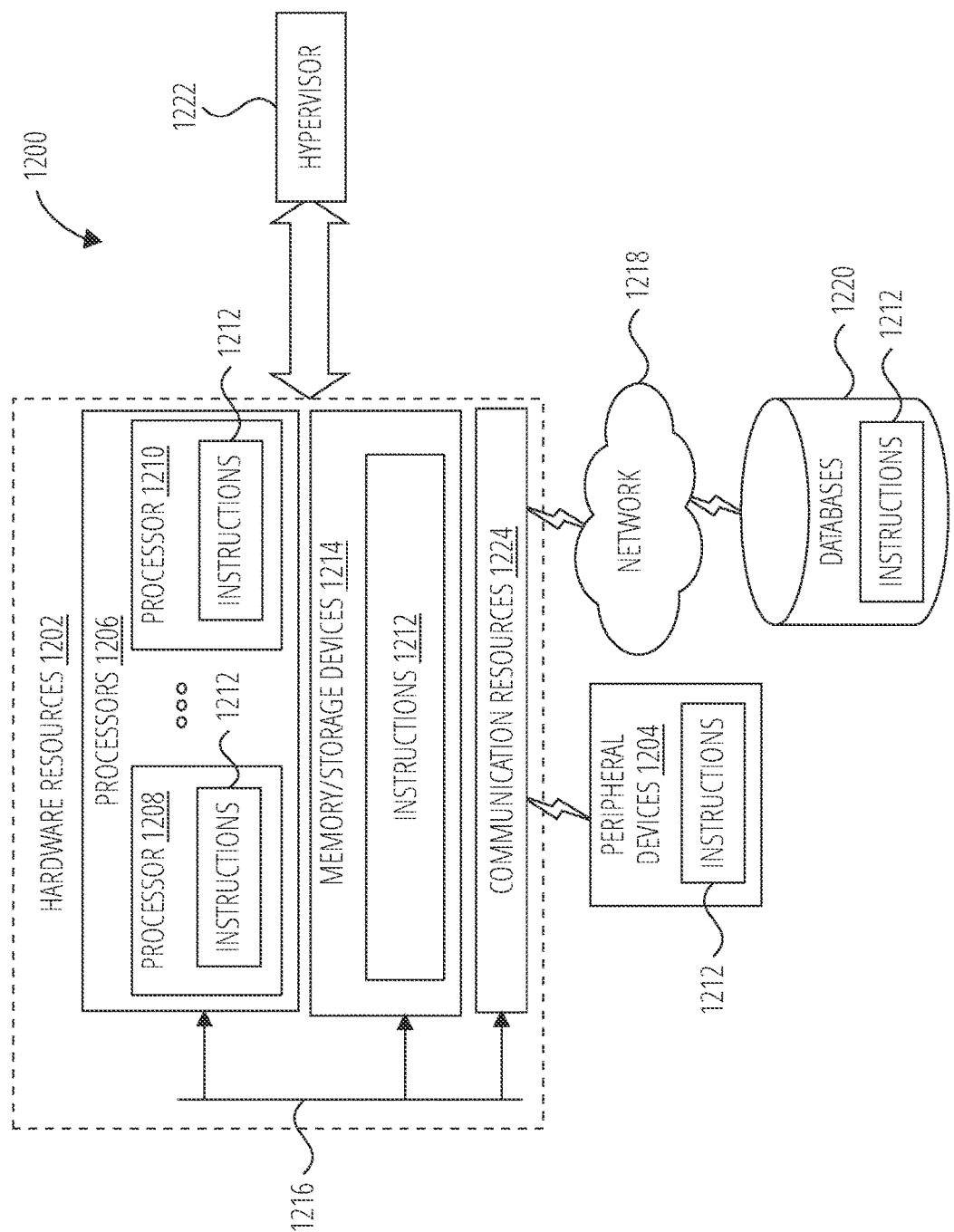
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1206 (or processor cores), one or more memory/storage devices 1214, and one or more communication resources 1224, each of which may be communicatively coupled via a bus 1216. For embodiments where node virtualization (e.g., NFV) is utilized, a hypervisor 1222 may be executed to provide an execution environment for one or more network slices/sub-slices to utilize the hardware resources 1202.

The processors 1206 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1208 and a processor 1210.

The memory/storage devices 1214 may include main memory, disk storage, or any suitable combination thereof. The memory/storage devices 1214 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1224 may include interconnection or network interface components or other suitable devices to communicate with one or more peripheral devices 1204 or one or more databases 1220 via a network 1218. For example, the communication resources 1224 may include wired communication components (e.g., for coupling via a Universal Serial. Bus (USB)), cellular communication components, NFC components, Bluetooth® components (e.g., Bluetooth® Low Energy), Wi-Fi® components, and other communication components.

Instructions 1212 may comprise software, a program, an application, an applet, an app, or other executable code for causing at least any of the processors 1206 to perform any one or more of the methodologies discussed herein. The instructions 1212 may reside, completely or partially, within at least one of the processors 1206 (e.g., within the processor's cache memory), the memory/storage devices 1214, or any suitable combination thereof. Furthermore, any portion of the instructions 1212 may be transferred to the hardware resources 1202 from any combination of the peripheral devices 1204 or the databases 1220. Accordingly, the memory of the processors 1206, the memory/storage devices 1214, the peripheral devices 1204, and the databases 1220 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 may include an apparatus comprising means to perform one or more elements of a method described in or related to any of the above embodiments, or any other method or process described herein.

Example 2 may include one or more non-transitory computer-readable media comprising instructions to cause an electronic device, upon execution of the instructions by one or more processors of the electronic device, to perform one or more elements of a method described in or related to any of the above embodiments, or any other method or process described herein.

Example 3 may include an apparatus comprising logic, modules, or circuitry to perform one or more elements of a method described in or related to any of the above embodiments, or any other method or process described herein.

Example 4 may include a method, technique, or process as described in or related to any of the above embodiments, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above embodiments, or portions thereof.

Example 6 may include a signal as described in or related to any of the above embodiments, or portions or parts thereof.

Example 7 may include a datagram, packet, frame, segment, protocol data unit (PDU), or message as described in or related to any of the above embodiments, or portions or parts thereof, or otherwise described in the present disclosure.

Example 8 may include a signal encoded with data as described in or related to any of the above embodiments, or portions or parts thereof, or otherwise described in the present disclosure.

Example 9 may include a signal encoded with a datagram, packet, frame, segment, PDU, or message as described in or related to any of the above embodiments, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above embodiments, or portions thereof.

Example 11 may include a computer program comprising instructions, wherein execution of the program by a processing element is to cause the processing element to carry out the method, techniques, or process as described in or related to any of the above embodiments, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE) to perform measurement object (MO) merging for channel state information reference signal (CSI-RS) layer 3 (L3) measurements, comprising:
   a memory device to store data corresponding to a first measurement configuration from a primary cell (PCell) and a second measurement configuration from a primary secondary cell (PSCell); and
   a processor to:
   process the first measurement configuration from the PCell to configure a first MO;
   process the second measurement configuration from the PSCell to configure a second MO, wherein the first MO and the second MO are for the UE to measure in synchronous intra-band dual connectivity (DC);
   determine whether the first MO and the second MO are to be counted only once in a total number of effective CSI-RS L3 MOs; and
   perform CSI-RS L3 measurements according to the total number of effective CSI-RS L3 MOs.

2. The UE of claim 1, wherein the first MO and the second MO are same intra-frequency CSI-RS L3 MOs for the UE to measure in the synchronous intra-band DC.

3. The UE of claim 1, wherein the first MO and the second MO are inter-frequency CSI-RS L3 MOs for the UE to measure on a same CSI-RS layer in the synchronous intra-band DC.

4. The UE of claim 1, wherein the processor is further configured to, if associated synchronization signal blocks (SSBs) are configured for CSI-RS resources corresponding to the first MO and the second MO, determine that the first CSI-RS L3 MO and the second CSI-RS L3 MO are to be counted only once in the total number of effective CSI-RS L3 MOs based on the associated SSBs being the same for the first MO and the second MO, unless there is a predetermined difference in at least one parameter between the first MO and the second MO.

5. The UE of claim 1, wherein the processor is further configured to, if associated synchronization signal blocks (SSBs) are not configured for CSI-RS resources corresponding to the first MO and the second MO, determine that the first CSI-RS L3 MO and the second CSI-RS L3 MO are to be counted only once in the total number of effective CSI-RS L3 MOs based on associated serving cells being the same for the first MO and the second MO, unless there is a predetermined difference in at least one parameter between the first MO and the second MO.

6. The UE of claim 1, wherein the processor is further configured to, if associated synchronization signal blocks (SSBs) are not configured for CSI-RS resources corresponding to the first MO and the second MO, determine that the first CSI-RS L3 MO and the second CSI-RS L3 MO are to be counted only once in the total number of effective CSI-RS L3 MOs based on associated serving cells corresponding to the first MO and the second MO being synchronized, unless there is a predetermined difference in at least one parameter between the first MO and the second MO.

7. The UE of claim 6, wherein the predetermined difference comprises different CSI-RS measurement windows or different CSI-RS measurement and time configurations.

8. The UE of claim 6, wherein the predetermined difference comprises different CSI-RS measurement bandwidths.

9. The UE of claim 6, wherein the predetermined difference comprises different CSI-RS densities for a same CSI-RS resource.

10. The UE of claim 6, wherein the first MO and the second MO are inter-frequency CSI-RS L3 MOs for the UE to measure on a same CSI-RS center frequency in the synchronous intra-band DC.

11. The UE of claim 10, wherein the predetermined difference comprises different subcarrier spacing (SCS) for the first MO and the second MO.

12. A method for a baseband processor of a user equipment (UE) to perform measurement object (MO) merging for channel state information reference signal (CSI-RS) layer 3 (L3) measurements, the method comprising:
- accessing data corresponding to a first measurement configuration from a primary cell (PCell) and a second measurement configuration from a primary secondary cell (PSCell);
- processing the first measurement configuration from the PCell to configure a first MO;
- processing the second measurement configuration from the PSCell to configure a second MO, wherein the first MO and the second MO are for the UE to measure in synchronous intra-band dual connectivity (DC);
- determining whether the first MO and the second MO are to be counted only once in a total number of effective CSI-RS L3 MOs; and
- configuring the UE perform CSI-RS L3 measurements according to the total number of effective CSI-RS L3 MOs.

13. The method of claim 12, wherein the first MO and the second MO are same intra-frequency CSI-RS L3 MOs for the UE to measure in the synchronous intra-band DC.

14. The method of claim 12, wherein the first MO and the second MO are inter-frequency CSI-RS L3 MOs for the UE to measure on a same CSI-RS layer in the synchronous intra-band DC.

15. The method of claim 12, further comprising, if associated synchronization signal blocks (SSBs) are configured for CSI-RS resources corresponding to the first MO and the second MO, determining that the first CSI-RS L3 MO and the second CSI-RS L3 MO are to be counted only once in the total number of effective CSI-RS L3 MOs based on the associated SSBs being the same for the first MO and the second MO, unless there is a predetermined difference in at least one parameter between the first MO and the second MO.

16. The method of claim 12, further comprising, if associated synchronization signal blocks (SSBs) are not configured for CSI-RS resources corresponding to the first MO and the second MO, determining that the first CSI-RS L3 MO and the second CSI-RS L3 MO are to be counted only once in the total number of effective CSI-RS L3 MOs based on associated serving cells being the same for the first MO and the second MO, unless there is a predetermined difference in at least one parameter between the first MO and the second MO.

17. The method of claim 12, further comprising, if associated synchronization signal blocks (SSBs) are not configured for CSI-RS resources corresponding to the first MO and the second MO, determining that the first CSI-RS L3 MO and the second CSI-RS L3 MO are to be counted only once in the total number of effective CSI-RS L3 MOs based on associated serving cells corresponding to the first MO and the second MO being synchronized, unless there is a predetermined difference in at least one parameter between the first MO and the second MO.

18. The method of claim 17, wherein the predetermined difference comprises different CSI-RS measurement windows or different CSI-RS measurement and time configurations.

19. The method of claim 17, wherein the predetermined difference comprises different CSI-RS measurement bandwidths.

20. The method of claim 17, wherein the predetermined difference comprises different CSI-RS densities for a same CSI-RS resource.

* * * * *